Figure 3:
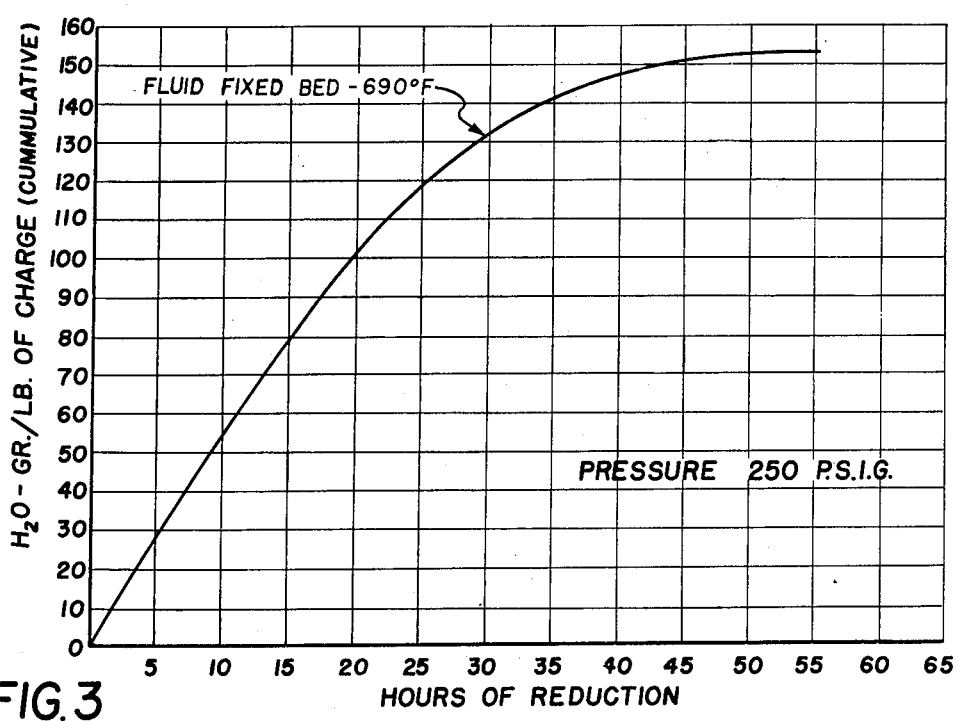

Dec. 27, 1955 H. G. McGRATH ET AL 2,728,786
REDUCTION OF IRON OXIDE FOR USE IN
THE SYNTHESIS OF HYDROCARBONS
Original Filed Dec. 16, 1948 2 Sheets-Sheet 1

INVENTOR.
HENRY G. MC GRATH
LOUIS C. RUBIN
BY E.F. Liebrecht
Cruzan Alexander
ATTORNEYS United States Patent Office 2,728,786
Patented Dec. 27, 1955

2,728,786

REDUCTION OF IRON OXIDE FOR USE IN THE SYNTHESIS OF HYDROCARBONS

Henry G. McGrath, Union, and Louis C. Rubin, West Caldwell, N. J., assignors to The M. W. Kellogg Company, Jersey City, N. J., a corporation of Delaware Original application December 16, 1948, Serial No. 65,707. Divided and this application March 30, 1951, Serial No. 218,362

6 Claims. (Cl. 260—449.6)

This invention relates to the reduction of finely-divided metal oxides suspended in the gaseous reducing medium. In one aspect the invention relates to the reduction of metal oxides, particularly iron oxides, for use as catalyst in the hydrogenation of carbon monoxide in which the catalyst is suspended in a finely-divided form in the gaseous reactants under conditions such that normally liquid organic compounds are produced in optimum quantity. In another aspect the invention relates to the method of producing an active catalyst for the hydrogenation of various carbon oxides including carbon dioxide and organic compounds containing the carbonyl group, such as ketones, aldehydes, acyl halides, organic acids and their salts in esters, acid anhydrides, amides, etc. This application is a division of my prior and copending application Serial No. 65,707, filed December 16, 1948, now Patent No. 2,671,765.

Various reduced metals, principally the metals of group VIII of the periodic system, such as iron, cobalt, nickel and ruthenium, may be employed in finely-divided form suspended in the reactants, hydrogen and carbon oxides, under conditions to produce organic compounds therefrom. For maximum activity, these metals are substantially completely reduced prior to use and are employed in finely-divided form in suspension in the gaseous reactants. The metals themselves are difficult to pulverize into finely-divided form in their reduced state. For this reason it is desirable to puverize or grind the oxides of the metals prior to their reduction, since the oxides are more easily pulverized than the reduced metals which are relatively malleable. Several methods have been proposed to reduce the oxides. One proposed method is to grind or pulverize the oxides to the desired size for use in suspended systems, pelleting the finely-divided material and reducing the pellets in a stationary bed in a reactor and subsequently repulverizing the pellets. Another proposed method is to pulverize or grind the oxides and then directly reduce the finely-divided oxides by suspending the finely-divided material in a reducing gas under conditions effective to substantially completely reduce the oxides.

The former method of reduction is somewhat cumbersome and requires a considerable amount of handling and equipment for pelleting and repulverizing the metallic material. This has its obvious disadvantages. From the standpoint of equipment and handling, the latter method is much preferred; however, reduction of finely-divided metal oxides at elevated temperatures has encountered considerable difficulty because of the tendency of the fluidized or suspended mass to agglomerate or deaerate after partial reduction. Thus, it is substantially impossible to obtain a completely reduced metal oxide by suspending the metals in a reducing gas at elevated temperatures. Conditions previously proposed for the reduction of finely-divided metal oxides by the suspended technique were substantially atmospheric pressures and temperatures above about 1100° F., usually about 1400° F. Under such conditions, substantially complete reduction of the metal oxide was impossible or impractical because of deaeration or the prolonged length of time required for reduction. No completely satisfactory explanation has been submitted for the deaeration of the metals during their reduction except that at the relatively high temperatures required the metals tended to sinter as they neared complete reduction, causing sticking or agglomeration of the finely-divided particles. It was also noted that when using relatively high temperatures for reduction the catalyst activity was lower, probably because of the sintering of the catalyst during reduction. It is much to be desired, therefore, to provide a method for reducing finely-divided metal oxides, particularly iron oxide, substantially completely by suspending the metal oxides in the gaseous reducing medium, thus eliminating pelleting and repulverizing of the material or pulverizing of the material after reduction.

It is an object of this invention to reduce finely-divided metal oxides substantially completely.

Another object of this invention is to provide a process for reducing finely-divided iron oxides, such as magnetite.

A further object of this invention is to provide a method for preventing deaeration of metal oxides during reduction thereof by the suspended technique.

It is yet a further object of this invention to reduce finely-divided metal oxides without sintering thereof.

Another object of this invention is to increase the reduction rate of finely-divided metal oxides when reduced with hydrogen.

Another object of this invention is to provide a method for producing a highly active catalyst for the hydrogenation of carbon oxides.

Various other objects and advantages of this invention will become apparent to those skilled in the art from an accompanying description and disclosure.

According to this invention we have discovered, much to our surprise, that finely-divided metal oxides, particularly iron oxides, are rapidly reduced at an elevated temperature when the finely-divided metal oxides are suspended in a reducing gas at substantial superatmospheric pressures without any difficulty encountered as to deaeration and agglomeration of the finely-divided metals. In effecting the reduction by suspending the finely-divided catalyst in a reducing gas, such as hydrogen, a substantially complete reduction is effected at relatively low temperatures and in a reasonable period of time. Our invention resides in the use of the elevated pressures during the reduction operation when the metal oxide is suspended in the reducing gas, such pressures being above about 100 pounds per square inch gage and as high as 600 pounds per square inch gage or higher. We prefer to use pressures between about 250 and about 500 pounds per square inch gage for the reduction operation. In using the elevated pressures for reduction, temperatures as low as 500° F. are suitable for reducing iron oxides to elementary iron. The use of temperatures below 1050° F. at substantially all times is completely satisfactory for the reduction of iron oxides and we prefer to use a temperature above 600° F. and below 700° F. at the preferred pressure range. The temperatures are chosen to correspond to the pressure employed to obtain substantially complete reduction in a period of time less than about 72 hours without using excess temperatures which cause sintering and agglomeration, relatively low temperatures being used with relatively high pressures within the above ranges, and vice-versa. The temperature of reduction is usually several hundred degrees below that temperature which would be required for reduction of the metal oxide at atmospheric pressure under otherwise similar conditions.

In practice, substantially pure hydrogen is employed as the reducing medium; small amounts of carbon monoxide and methane may accompany the hydrogen without detrimental effect upon the reduction procedure. The theoretical amount of hydrogen required for complete reduction per pass is employed but, due to incomplete reduction per pass, hydrogen is recycled after removal of water formed during the reduction treatment, fresh hydrogen being added to make up for that consumed by the reduction.

In preparing a substantially completely reduced iron catalyst for the synthesis process containing various amounts of an alkali metal or alkaline earth oxide, it is preferred to maintain the temperature below about 950° F. during reduction of a high alkali catalyst containing about one per cent alkali (calculated as a metal oxide) and a temperature below about 1050° F. for a low alkali iron catalyst containing below about 0.8 per cent alkali (calculated as the metal oxide). As to the composition of iron synthesis catalyst containing various amounts of alkali and to their preparation, attention is directed to application Serial No. 725,835, filed February 1, 1947, now Patent No. 2,598,647, by Henry G. McGrath, one of the co-inventors of this application.

In general, the time of reduction of iron oxide will range from about ten hours to about sixty hours, but will depend on such factors as the completeness of reduction required, the temperature of reduction and the pressure employed. Reduction periods less than or greater than the above range may be employed without departing from the scope of this invention. This period of reduction will also depend upon the particle size of the metal oxide being reduced. Considerable attention should be directed to obtain a relatively fine particle size of the metal oxide prior to reduction. It is preferred, therefore, that substantially all of the metal oxide be of a particle size less than about 250 microns, to be discussed more fully hereinafter. Substantially complete reduction is evidenced by the cessation of the formation of water and its absence from the reduction effluent gases.

According to one embodiment of this invention utilizing the suspended technique, substantially pure hydrogen is passed through a reaction zone in contact with a suspended mass of finely-divided iron oxides, such as naturally occurring magnetite which may have been impregnated with suitable promoters. In this embodiment the hydrogen is passed through the mass of finely-divided catalyst at a linear gas velocity sufficient to suspend the iron oxide mass in a fluidized pseudo-liquid dense phase condition. It is preferred to maintain the upward velocity of the hydrogen sufficiently high to maintain the fluidized metal oxide mass in a highly turbulent condition in which the catalyst particles circulate at a high rate within the pseudo-liquid dense mass. The concentration or density of the iron oxides expressed as pounds per cubic foot is between about one-quarter and about three-quarters of the density of the metal oxide in a freely settled condition when in the finely-divided form. For example, with finely-divided iron oxide, the freely settled density is about 100 to about 150 pounds per cubic foot and the density of the pseudo-liquid dense phase is generally in the range between about 30 and about 90 pounds per cubic foot, depending upon the gas velocity, particle size, state of oxidation, etc.

With the metal oxide present in the pseudo-liquid condition, the powdered metal oxide mass is maintained in a reactor substantially larger than the volume occupied by the mass in the fluidized condition. In this type of operation all but a minor proportion of the metal oxide mass is contained in the dense fluidized pseudo-liquid mass, which may be designated as the dense phase. This dense phase occupies the lower portion of the reactor while that portion of the reactor above the dense phase is occupied by hydrogen and finely-divided powdered metal oxides and reduced metals in which the solids concentration is much lower and of a different order of magnitude than the concentration of solids in the dense phase. This upper phase may be designated as the diffuse phase and acts like a disengaging zone in which solids are elevated above the dense phase by the flowing gas and are disengaged therefrom and returned to the dense phase to the extent that such solids are in excess of the carrying capacity of the gas stream at the gas velocity thereof. In the dense phase the concentration of catalyst in the gas stream varies from a maximum near the gas inlet to a minimum in the upper part of this phase. Likewise, the concentration of catalyst in the diffuse phase varies from a maximum near the upper surface of the dense phase to a minimum in the upper part of the reactor. Between the dense phase of high average concentration and the diffuse phase of low average concentration there is a relatively narrow zone in which the concentration of solids in the gas stream changes in a short space from the high concentration of the dense phase to the low concentration of the diffuse phase. This intermediate zone has the appearance of an interface between two visually distinct phases. The diffuse phase generally has a concentration of solids less than about 0.01 pound of solids per cubic foot of gas.

This pseudo-liquid dense phase type operation ordinarily involves the solid powders and linear gas velocities such that a relatively small portion of the dense fluidized solid mass is carried away by entrainment, and it is necessary, therefore, to provide means in the reactor for separating such entrained solids and returning them to the dense phase, or to provide means external of the reactor to separate entrained solids from the gaseous effluent and return them to the reactor, or otherwise to recover solids from the gaseous effluent.

The linear velocity of the hydrogen passing upward through the dense phase is conveniently expressed in terms of superficial velocity, which is the linear velocity the gas stream would assume if passed through the reactor in the absence of solids. The superficial velocity for the dense phase pseudo-liquid type of operation is in the range of between about 0.1 and about 5 feet per second.

Another method of operating the suspended system is the use of gas velocities sufficiently high such that the heaviest particles of solids continuously move in the direction of flow of the gases by suspension or entrainment and the removal of the solids with the gaseous effluent from the reduction zone. In this method of operation the so-called "pseudo-liquid dense phase of solids" is not formed because of the relatively high velocity of the gases passing through the reduction zone. The solids are separated from the hydrogen effluent and recycled to the inlet of the reduction zone by conventional means, such as standpipes or Fuller-Kinyon pumps. The hydrogen, after removal of water therefrom, is also recycled to the inlet of the reduction zone. In this method of operation the concentration or density of the solids in the reduction zone is considerably less than that conventional dense phase operations and the tendency for agglomeration and sticking is correspondingly minimized. The concentration or density of the finely-divided metal oxides utilizing relatively high velocities such that the solids are continuously moved in the direction of flow of the gases is about one-sixth of the freely settled density of the metal oxides and is usually less than about 25 pounds of solid per cubic foot of gas and may be as low as 10 to 12 pounds per cubic foot of gas or less. The velocity employed in order to achieve the continuous flow of the solids with the gases is above about 5 or 6 feet per second, preferably above about 8 feet per second, and may be as high as about 50 feet per second. The solids are continuously recycled until they are substantially completely reduced.

Suspension of the solids initially may be effected with the use of a substantially inert gas, such as carbon dioxide, followed by the introduction of hydrogen at the desired rate. The reduction zone may be heated in the conventional manner. Preheating the hydrogen gas or the suspending gas to the desired reduction temperature is an effective way in heating the reaction zone. The reaction zone may be heated indirectly with a Dowtherm jacket or the like. Indirect heating as well as preheating the hydrogen may be used simultaneously if desired without departing from the scope of this invention.

Various metal oxides may be reduced according to this invention. However, the description and examples are specifically directed to the reduction of iron oxide or naturally occurring magnetite. The metal oxides prepared for example as catalysts for synthesis reactions may be impregnated with various promoters and supported on various supports, such as alumina-silica gel, bentonite type clay, etc. In this specification and claims the catalyst is described by reference to its chemical condition subsequent to its reduction and may include various promoters and supports.

The finely-divided solids are employed in a fine state of subdivision. Preferably, the powdered solids initially contain no more than a minor proportion by weight of material whose particle size is greater than 250 microns. Preferably also, the greater proportion of the solids being reduced comprise material whose particle size is smaller than 100 microns, including at least 25 weight per cent of the material having a particle size smaller than 40 microns. A highly fluidizable powder comprises at least 75 per cent by weight of material smaller than 150 microns in particle size and at least 25 per cent by weight smaller than 40 microns in particle size.

This invention also has application to the regeneration of a spent or used synthesis catalyst by the treatment of the used catalyst with hydrogen at an elevated pressure, in accordance with the previous discussion. As previously stated, the invention applies to the preparation of a reduced synthesis catalyst and in such operation the reduction may be effected in the reaction zone itself followed by introduction of the synthesis feed gas after reduction of the catalyst. Alternatively, the reduction may be effected in a separate reaction zone and the reduced catalyst transferred to the main synthesis reaction zone. In regenerating the catalyst after use in the hydrogenation of carbon oxides, a similar procedure is followed as in reduction of the metal oxides prior to their use as a catalyst. In regeneration the catalyst may be reduced in the synthesis reaction zone by discontinuing flow of synthesis gas therethrough followed by the introduction of hydrogen at an elevated temperature and at superatmospheric pressures. Alternatively, a separate reduction zone may be employed and, under such circumstances, catalyst may be intermittently or continuously withdrawn from the synthesis reaction zone and transferred to the reduction zone. After reduction of the spent catalyst, the catalyst may be continuously or intermittently returned to the synthesis reaction zone. It may be desirable, after reduction, to activate the catalyst in accordance with the procedure taught in application Serial No. 783,382, filed October 31, 1947, by Henry G. McGrath, one of the co-inventors of this application, now Patent No. 2,542,422.

Figure 1:
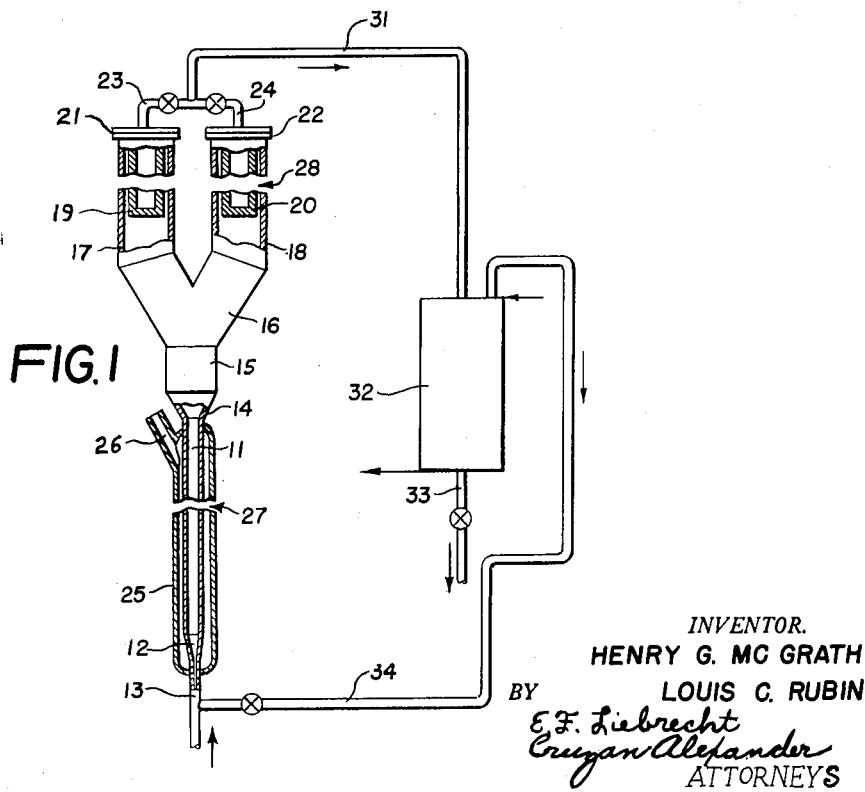
Figure 2:
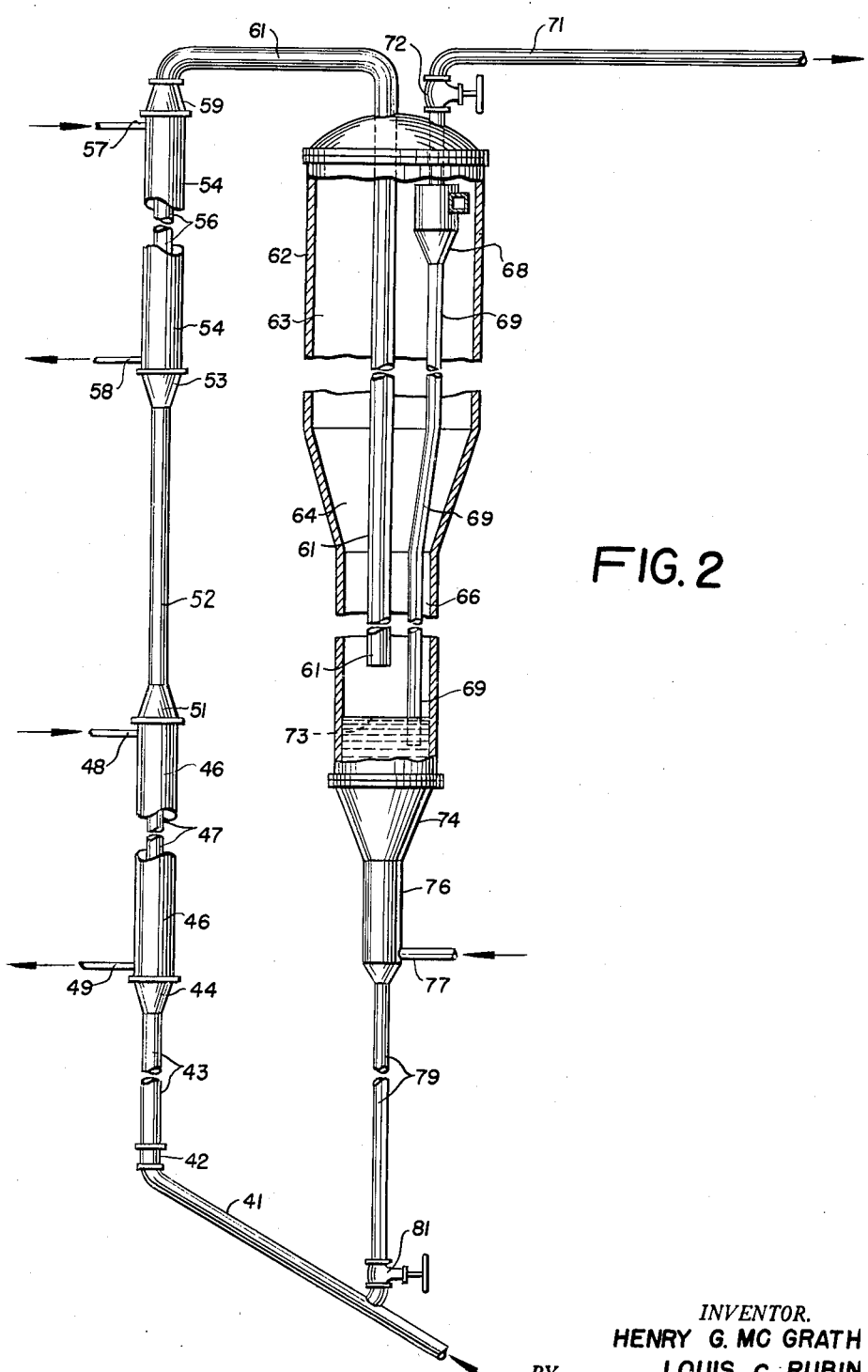

The two modes of operation, using the pseudo-liquid dense phase type of operation and the high velocity circulating operation, may be best described by reference to the drawings in which Figure 1 is a view in elevation, partly in cross-section, of a relatively small reactor suitable for reducing metal oxides by the fluidized dense phase type of operation, and in which Figure 2 is a view in elevation, partly in cross-section, of a reactor suitable for carrying out the reduction of metal oxides employing the high velocity circulating system. The reactor of Figure 1 was employed for the reduction effected in accordance with Example 1 hereinafter. The reactor of Figure 1 was employed for the reduction of metal oxide in accordance with Example 2 hereinafter.

Referring to Figure 1, reactor 11 consists of a length of extra heavy standard 2-inch steel pipe which is about 153 inches long and has inside and outside diameters of 1.94 inches and 2.38 inches, respectively. Reactor 11 is connected, by conical section 12, to an inlet pipe 13 made of extra heavy standard half-inch steel pipe having an inside diameter of 0.55 inch. Reactor 11 is connected at the top, by means of conical section 14, with an enlarged conduit 15 comprising a length of 6-inch extra heavy standard steel pipe having an inside diameter of 5.76 inches. Conical section 14 and conduit 15 constitute an enlarged extension of reactor 11 which facilitates disengagement of catalyst from the gas stream after passage of the latter through a dense catalyst phase.

Conduit 15 is connected by means of manifold 16 with conduits 17 and 18 which comprise other sections of extra heavy 6-inch standard steel pipe. Conduits 17 and 18 contain filters 19 and 20 which are constructed of porous ceramic material which is permeable to the gas and vapors emerging from the reaction zone but impermeable to the catalyst particles carried by entrainment in the gas stream. Filters 19 and 20 are cylindrical in shape and closed at the bottom ends. They are dimensioned in relation to conduits 17 and 18 to provide a substantial annular space between the filter and the inner wall of the enclosing conduit for the passage of gases and vapors and entrained catalyst upwardly about the outer surface of the filter. The upper ends of filters 19 and 20 are mounted in closure means 21 and 22 in a manner whereby the gases and vapors must pass through either filter 19 or filter 20 to reach exit pipes 23 and 24. Each of filters 19 and 20 is approximately 36 inches long and 4½ inches in outside diameter, the ceramic filter walls being approximately ¾ of an inch thick.

The greater part of reactor 11 is enclosed in a jacket 25 which extends from a point near the top of the reactor to a point sufficiently low to enclose the 3 inch length of conical section 12 and approximately 5 inches of pipe 13. Jacket 25 comprises a length of extra heavy 4-inch standard steel pipe having an inside diameter of 3.83 inches. The ends of jacket 25 are formed by closing the ends of the 4-inch pipe in any suitable manner, as shown, and sealed by welding. Access to the interior of jacket 25 is provided by an opening 26 in the top thereof through a 2-inch steel pipe. Jacket 25 is adapted to contain a body of liquid for temperature control purposes, such as water, or "Dowther." The vapors which are evolved by the heat of reaction in reactor 11 are withdrawn through conduit 26, condensed by means not shown, and returned through conduit 26 to the body of temperature control fluid in jacket 25. The temperature control fluid in jacket 25 is maintained under a pressure at which the liquid boils at the temperature desired in jacket 25. Electrical heating means (not shown) is provided in connection with jacket 25 to heat the temperature control fluid therein to any desired temperature.

In order to show all the essential parts of the reactor and associated catalyst separation means on a single sheet, a large proportion of the apparatus has been eliminated by the breaks at 27 and 28. For a clear understanding of the relative proportions of the apparatus reference may be had to the over-all length of the apparatus, from the bottom of jacket 25 to exit pipes 23 and 24, which is about 224 inches. In each of breaks 27 and 28 the portion of the apparatus eliminated is identical with that portion shown immediately above and below each break.

In the operations carried out in the apparatus of the drawing the catalyst recovery means comprising filters 19 and 20 is effective to separate substantially completely entrained catalyst from the outgoing stream of gases and vapors. The disengagement of solids from the gas stream is promoted by the lowered velocity of the gas stream in conduits 15 and remaining solids are separated on the outer surfaces of filters 19 and 20. The latter are employed alternately during the operation so that the stream of gases and vapors and entrained solids passes from conduit 15 through either the left or right branches of manifold 16 into either conduit 17 or conduit 18. During the alternate periods the filter which is not in use is subjected to a back pressure of gas which is introduced at a rate sufficient to dislodge catalyst which has accumulated on the outer surface of the filter during the active period. Such "blowback" gas and dislodged catalyst flow downwardly in the conduit enclosing the filter and into manifold 16 in which the "blowback" gas is combined with the reaction mixture flowing upwardly from conduit 15. The greater part of the catalyst thus dislodged settles downwardly into the reactor and is thus returned for further use. The "blowback" gas conveniently comprises recycle gas, such as from conduit 34.

In the operation of the reactor of Figure 1 of the drawings the desired quantity of powdered metal oxides is introduced directly into the reactor through a suitable connection not shown in conduit 15. The temperature of the fluid in jacket 25 is adjusted by the heating means mentioned above and by the pressure control means to a temperature of about 650° F. The hydrogen gas is preheated to a temperature of about 650° F. and is then passed through pipe 13 into reactor 11. The velocity of the hydrogen gas passing upward through reactor 11 is about 1½ feet per second such that the finely-divided solids form a pseudo-liquid dense phase in the lower portion of reactor 11. Gases and entrained solids pass from reactor 11 through conduits 14, 15 and 16 to both of conduits 17 and 18. Entrained solids are removed by filters 19 and 20 and the gas substantially free from solids is removed from conduits 17 and 18 through heaters 21 and 22 respectively and are passed through conduits 23 and 24 to conduit 31. The gaseous effluent from the reduction reaction contains steam formed by the reduction of the metal oxides with hydrogen. This effluent is passed through conduit 31 to a cooler condenser 32 in which the effluent is cooled to an approximately atmospheric temperature. Under such conditions and at the operating pressure all of the water is condensed from the effluent and is removed from cooler condenser 32 through conduit 33. The effluent comprising hydrogen and substantially free from entrained solids and water is passed from cooler condenser 32 through conduit 34 to inlet conduit 13. The recycled hydrogen in conduit 34 may be preheated, if desired, by a heater not shown or preheating may be effected by heat exchange in section 12 of reactor 11 with jacket 25.

A ball check valve (not shown) is provided to prevent solids from passing downward out of the reactor when the gas stream is not being introduced into pipe 13.

According to Figure 2 of the drawings showing the high velocity method of operation, hydrogen preheated to a desired temperature of about 700° F. or higher is introduced into conduit 41. In conduit 41 the gas stream picks up finely-divided solids from a standpipe 79. Conduit 41 is a standard 2" steel pipe and is about 2½ feet in length from the point of introduction of the solids therein. The solid loading rate into conduit 41 is regulated by a conventional slide valve 81. At a minimum velocity of about 28 feet per second in conduit 41, intimate mixing of finely-divided metal oxides and hydrogen is achieved and the reduction reaction started immediately at a mixing temperature of about 650° F. to 700° F. The gaseous mixture of hydrogen and entrained solids is passed through conduit 41 to a first heat exchanger 46 through a standard 4 to 2 inch reducer 42 and a standard 4 inch diameter pipe 43. Standard 4 inch diameter pipe 43 provides a minimum velocity of about 6 feet per second at the reaction conditions. Heat exchanger 46 comprises a cylindrical shell surrounding a 4 inch standard pipe 47. Cooler 46 is connected to conduit 43 by means of a standard reducing fitting 44 and to conduit 52 by reducing fitting 51. Reducer 52, conduit 43, and fitting 44 together are about 10 feet 8 inches in length. Heat exchanger 46 is approximately 12 feet in length. A heat exchange medium, such as Dowtherm, is introduced into the annular space between pipe 47 and the shell of cooler 46 by means of an inlet conduit 48. The heat exchange medium flows downward in indirect contact with the upward flowing gaseous reaction mixture in pipe 47 and is removed from the lower portion of heat exchanger 46 by means of an outlet conduit 49. The heat exchange medium is maintained in heat exchanger 46 at a temperature approximately equivalent to the desired reduction temperature of about 650° F. The reaction mixture of hydrogen and solids is passed from heat exchanger 46 through reducer 51 into standard 4 inch diameter pipe 52 and thence through pipe 52 and fitting 53 to a second heat exchanger 54 similar in construction and design to heat exchanger 46. The length of conduit 52 is such that the temperature change of the reaction mixture is small prior to introduction into a second heat exchanger 54. Conduit 52 may contain a restricted section of about 2 inches in diameter to aid in mixing the solids and gases therein. In the present design the length of conduit 52, including reducing fittings 51 and 53, is about 7 feet 8 inches.

Cooler 54 comprises a cylindrical shell surrounding a 4 inch standard pipe 56 through which the gaseous reaction mixture and the entrained solids flow. A heat exchange medium is introduced into the annular space between pipe 56 and the cylindrical shell of cooler 54 by means of inlet conduit 57. The heat exchange medium at a temperature of about 650° F. passes countercurrently in indirect heat exchange with the flowing gaseous mixture in pipe 56. The heat exchange medium is removed from heat exchanger 54 through an outlet conduit 58. Heat exchanger 54 is approximately 12 feet in length. The reaction mixture at the desired reduction temperature and containing entrained solids is removed from heat exchanger 54 and passed through a standard reducing fitting 59, a standard 4 inch pipe 61 to catalyst separator 62. The horizontal section of conduit 61 may be of smaller diameter than the vertical section, for example about 2 inches in diameter, in order to minimize or prevent the tendency of the solids to settle in the horizontal section. Separator 62 comprises an upper enlarged cylindrical section 63, an intermediate conical section 64 and a lower cylindrical section 66. Enlarged section 66 comprises a standard 24 inch diameter pipe in which section the major proportion of the solids is separated from the reduction effluent. A fluidized bed of solids is maintained in accumulator 66 at a level indicated by numeral 73. Conduit 61 preferably terminates above or adjacent to level 73 such that the effluent gases issued therefrom cause a highly turbulent action in the bed of solids in accumulator 66. This turbulent action caused by the effluent gases from conduit 61 prevents caking of the finely-divided solids in accumulator 66. A conventional cyclone separator 68 is positioned inside enlarged section 66. Gases containing finely-divided entrained solids pass into cyclone separator 68 where entrained solids are separated from the gases. Solids thus separated pass from cyclone separator 68 downward through a standard 69 into the lower portion of accumulator 66 below interface 73. Standpipe 69 comprises a ¾ inch standard pipe. An effluent comprising hydrogen and water vapor substantially free from entrained solids is removed from cyclone separator 68 through conduit 71 and gate valve 72. From conduit 71 the effluent passes to a cooler and condenser (not shown) for removal of water vapor; thereafter, the hydrogen substantially free from water vapor is recycled to conduit 41.

Solids which have been separated from the gaseous reduction effluent are passed to a stripping and purging section 76 by means of a standard reducer 74. Section 76 comprises a standard 2½ inch steel pipe. Hydrogen is introduced into section 76 through conduit 77 for purging the recycled solids of water vapor contained in the reduction effluent. Finely-divided solids comprising metal oxides and elementary metal is passed from section 76 by means of a standard reducer 78 into a standpipe 79 comprising a 2 inch standard pipe. A standard 2 inch slide valve 81 is provided in the lower portion of standpipe 79 to regulate the flow of solids including metal oxides and elementary metal into conduit 41. Recycling of the solids and hydrogen is continued until the reduction of the metal oxides to the elementary metal is substantially complete. After reduction the solids may be withdrawn from the reactor for use as catalyst or other purposes, or may be retained in the reactor and synthesis gas passed upwardly therethrough for effecting the hydrogenation of carbon oxides to organic compounds.

The following examples are offered as a means of better understanding the present invention, and the specific recitation of certain limitations in the examples should not be considered unnecessarily limiting to the present invention:

EXAMPLE 1

A fused iron oxide catalyst containing approximately 0.6% potassium oxide based on Fe was reduced in the apparatus of Figure 1 in accordance with this invention. This catalyst was prepared by admixing potassium carbonate and concentrated Alan Wood ore and fusing the resulting mixture. After fusion the solids were pulverized to a relatively fine powdered material within the range previously discussed in this specification. The average temperature of reduction varied between about 610° F. and about 695° F. Substantially complete reduction was completed after about forty-two hours. Table I below shows the reduction procedure for this operation. The fluidized pseudo-liquid technique was employed for the reduction and no difficulty was encountered in fluidizing the material at a pressure of about 250 pounds per square inch gage under reduction conditions.

Table I

[Reduction of 40 pounds of fused Alan Wood ore at 250 p. s. i. g.]

| Hours of Reduction | Average Temp., °F. | Inlet $H_2$, S. C. F. H. | $H_2O$ Produced, gr./hr. | Outlet $H_2/H_2O$ |
| --- | --- | --- | --- | --- |
| 0 | 610 | 880 | 35 | 600 |
| 6 | 687 | 895 | 194 | 106 |
| 12 | 695 | 905 | 226 | 91 |
| 18 | 693 | 894 | 207 | 99 |
| 24 | 689 | 929 | 190 | 112 |
| 30 | 680 | 839 | 81 | 240 |
| 36 | 696 | 941 | 43 | 494 |
| 42 | 648 | 796 | 24 | 884 |

Figure 3 of the drawings is a plot of the hours of reduction versus the grams of water formed during reduction per pound of total iron oxide charged to the reduction zone for the reduction operations of Example 1.

After reduction, the catalyst was activated in accordance with the procedure outlined in the aforesaid application Serial No. 783,382 and used for the hydrogenation of carbon monoxide to produce normally liquid organic compounds. The results obtained with this particular catalyst were similar to the results in application Serial No. 783,382, now Patent No. 2,542,422, for the successful operations shown therein. For a more detailed discussion of the catalyst preparation and results obtained, attention is directed to our prior and copending application Serial No. 735,536, filed March 18, 1947, in which we were co-inventors, now Patent No. 2,543,327. The results obtained with catalyst reduced in this manner are also shown in our application Serial No. 690,820 filed August 15, 1946, now abandoned, in which an iron synthesis catalyst was reduced at 150 pounds per square inch gage. After use, the synthesis catalyst may be re-reduced in a similar manner as the fresh catalyst, as described in this invention.

EXAMPLE 2

This example relates to the reduction of iron oxide by the high velocity technique. The catalyst reduced according to this example consisted of concentrated Alan Wood ore containing 1.5 potassium oxide based on Fe and which had been previously fused and ground to a finely-divided condition. The potassium oxide was obtained by incorporating the potassium carbonate with the Alan Wood ore prior to fusion. The reduction was effected in the reactor of Figure 2 at a temperature of about 650° F. and a pressure of about 250 pounds per square inch gage. The reduction was completed in less than about 50 hours. Table II below shows the operating conditions employed with the reactor of Figure 2 in reducing Alan Wood ore catalyst:

Table II

Temperature, °F.:
  Recycle catalyst _____ 655
  Inlet gas _____ 740
Catalyst rate, lb./hr _____ 3230
Catalyst loading, P. C. F _____ 1.3
Catalyst density, P. C. F.:
  In reactor _____ 33
  In recycle standpipe _____ 92

After reduction the catalyst was activated at a pressure below about 85 pounds per square inch gage and subsequently used as a synthesis catalyst for the hydrogenation of carbon monoxide to produce normally liquid organic compounds at 250 pounds per square inch gage. Table III shows the analysis of the catalyst prior to and after reduction and during the activation and synthesis operations. Table IV below shows the conditions of operation and results obtained during the activation treatment and during the synthesis proper at 250 pounds per square inch gage. The activation treatment was effected in accordance with the disclosure of the aforesaid application Serial No. 783,382 and the catalyst was prepared in accordance with the teachings of the aforesaid application Serial No. 735,536.

Table III

| Run No. | 2,263 | | | 2,266 | | |
| --- | --- | --- | --- | --- | --- | --- |
| Operating Hours | 0 | 28 | 52 | 29 | 47 | 65 |
| | Reduction | | | Activation | | |
| Chemical Analysis, Wt. Percent: | | | | | | |
| Wax | | | | 0.3 | 0.5 | 0.5 |
| Carbon | | | | 12.0 | 14.2 | 15.4 |
| Total Iron | | | | 84 | 81 | 77 |
| Iron Distribution (X-Ray), Wt. Percent: | | | | | | |
| Free Iron | | 80 | 100 | 7 | 4 | 4 |
| Iron Carbide ($Fe_2C$) | | | | 91 | 95 | 94 |
| Iron Oxide ($Fe_3O_4$) | | 20 | | 2 | 1 | 2 |
| Roller Analysis, Wt. Percent: | | | | | | |
| 0–10 | 14 | | | 17 | 17 | 18 |
| 10–20 | 10 | | | 12 | 21 | 12 |
| 20–40 | 13 | | | 19 | 19 | 17 |
| 40–60 | 27 | | | 27 | 21 | 27 |
| 60+ | 36 | | | 25 | 22 | 26 |
| Sp. Gr. | 5.0 | | | 5.0 | 5.1 | 4.8 |

Table IV

| Hours on Condition | 12 | 6 | 12 | 18 | 18 |
|---|---|---|---|---|---|
| Operating Hours (Total) | 29 | 47 | 65 | 95 | 119 |
| Operating Conditions: | | | | | |
| Reactor: | | | | | |
| Max. Temp., °F | 650 | 625 | 625 | 620 | 610 |
| Pressure, p. s. i. | 82 | 120 | 150 | 252 | 247 |
| Density, PCF | 30 | 29 | 28 | 27 | 27 |
| Velocity, FPS | 5.7 | 5.3 | 5.0 | 4.9 | 4.8 |
| Cat. Holdup, lb. | 119 | 123 | 124 | 123 | 121 |
| Standpipe: Density, PCF | 70 | 65 | 66 | 71 | 73 |
| Preheater Temp., °F | 680 | 530 | 500 | 410 | 370 |
| Slide Valve pressure in inches of $H_2O$ | 80 | 75 | 70 | 105 | 125 |
| Fresh Feed, SCFH | 2,450 | 2,940 | 3,420 | 5,070 | 5,820 |
| Recycle, SCFH | 3,980 | 4,970 | 5,610 | 8,360 | 7,420 |
| Total Inlet, SCFH | 6,430 | 7,910 | 9,030 | 13,430 | 13,240 |
| Product, SCFH | 330 | 380 | 510 | 740 | 990 |
| Recycle Ratio (Recycle/FF) | 1.62 | 1.69 | 1.64 | 1.65 | 1.28 |
| Results: | | | | | |
| Percent CO Dis./Pass | 88.0 | 83.2 | 85.1 | 89.2 | 91.4 |
| Percent $CO_2$ Dis./Pass | 37.0 | 38.0 | 39.1 | 47.0 | 39.4 |
| SCFH CO Conv./Lb. Fe. | 4.1 | 4.7 | 5.1 | 9.2 | 11.7 |
| Percent CO $CO_2$ | −30.7 | −30.3 | −28.4 | −34.1 | −32.4 |
| Bbl. Cond. Oil/MMCF FF | 11.4 | 14.9 | 16.5 | 17.2 | 16.7 |
| Bbl. Cond. Oil/MMCF TF | 4.3 | 5.5 | 6.2 | 6.5 | 7.4 |
| Bbl. $H_2O$/MMCF FF | 41 | 45 | 46 | 48 | 49 |
| Bbl. $H_2O$/MMCF TF | 15.8 | 16.6 | 17.3 | 18.3 | 21.5 |
| Bbl. Cond. Oil/Day | 0.7 | 1.1 | 1.4 | 2.1 | 2.3 |
| Inlet Gas Orsat, Vol. Percent: | | | | | |
| $CO_2$ | 5.7 | 5.0 | 4.8 | 4.9 | 6.6 |
| CO | 7.8 | 7.5 | 7.8 | 7.6 | 8.8 |
| Unsats ($H_2$—remainder) | 7.7 | 9.5 | 9.3 | 9.5 | 8.0 |
| Fresh Feed Orsat, Vol. Percent: | | | | | |
| $CO_2$ | 6.6 | 6.6 | 7.0 | 6.9 | 7.6 |
| CO ($H_2$—remainder) | 21.7 | 21.7 | 21.5 | 21.7 | 21.2 |
| Product Gas Orsat, Vol. percent: | | | | | |
| $CO_2$ | 5.3 | 4.6 | 4.3 | 3.9 | 6.3 |
| CO | 1.4 | 1.9 | 1.7 | 1.2 | 1.2 |
| Unsats | 10.9 | 13.3 | 13.7 | 13.6 | 12.7 |

The catalyst was considered highly active and produced large yields of normally liquid organic compounds.

The alkali reduced iron synthesis catalysts of Examples 1 and 2 were extremely active due to their pyrophoric nature. The finely-divided particles of the reduced catalyst burned with a red glow when exposed to the atmosphere.

The high pressure low temperature reduction technique is applicable to various metal oxides which are difficult to reduce when suspended in a reducing gas. Although iron oxide has been described throughout the application as the metal oxide being reduced, the invention has application to other metal oxides, such as nickel, cobalt and ruthenium oxides. The invention is also applicable to the reduction of metal sulfides and ores, particularly iron sulfides and iron ores. The essence of the invention resides primarily in the use of elevated pressures and relatively low temperatures in combination with a suspended technique for reducing oxides and sulfides of metals. The parent application Serial No. 65,707, filed December 16, 1948, now Patent No. 2,671,765, is a continuation-in-part of our prior and copending applications Serial No. 612,282 filed August 23, 1945, now abandoned; Serial No. 690,820 filed August 15, 1946, now abandoned, and Serial No. 735,536 filed March 18, 1947, now Patent No. 2,543,327.

Having described our invention, we claim:

1. In a process for hydrogenating a carbon oxide in which a gaseous reaction mixture comprising hydrogen and carbon oxide is contacted with a finely divided contact material comprising iron containing an alkali compound, the steps comprising continuously flowing hydrogen upwardly through a reduction zone in contact with iron oxide containing an alkali compound having a fluidizable particle size, maintaining the linear gas velocity in said reduction zone sufficient to suspend the particles of iron oxide containing alkali compound in the gas stream in the reduction zone, reducing iron oxide to elementary metal at a temperature above 500° F. and below 700° F. and at a pressure of at least 100 pounds per square inch gage for a period of time of at least 10 hours sufficient to reduce iron oxide to elementary metal, whereby sintering and agglomeration of iron oxide is prevented during reduction, and thereafter contacting the iron contact material thus subjected to reducing treatment with an upwardly flowing reaction mixture comprising hydrogen and a carbon oxide at a gas velocity effective to suspend said fluidizable contact material in said stream of reactants at a temperature level effective to produce the desired catalytic reaction.

2. In a process for hydrogenating a carbon oxide in which a gaseous reaction mixture comprising hydrogen and a carbon oxide is contacted with a finely divided contact material comprising iron containing an alkali compound, the steps comprising continuously flowing hydrogen upwardly through a reduction zone in contact with an iron oxide containing an alkali compound having a fluidizable particle size, maintaining the linear gas velocity in said reduction zone sufficiently low to suspend the finely divided particles in a pseudo-liquid dense phase condition and sufficiently high to produce rapid circulation of the particles throughout the dense phase, reducing iron oxide to elementary metal at a temperature above 500° F. and below 700° F. at a pressure between about 100 and about 500 pounds per square inch gage for a period of time of at least about 10 hours sufficient to reduce iron oxide to elementary metal, whereby sintering and agglomeration of iron oxide is prevented during reduction, and thereafter contacting the iron contact material thus subjected to reducing treatment with an upwardly flowing reaction mixture comprising hydrogen and a carbon oxide at a gas velocity effective to suspend said finely divided contact material in said stream of reactants at a temperature level effective to produce the desired catalytic reaction.

3. In the process of claim 2 in which said iron contact material contains less than 0.8 weight per cent alkali compound.

4. In a process for reacting hydrogen and carbon monoxide in which a gaseous mixture comprising said hydrogen and carbon monoxide is contacted with a finely divided contact material consisting essentially of reduced iron and containing an alkali compound, the steps comprising continuously flowing a reducing gas consisting essentially of hydrogen upwardly through a reduction zone in contact with an iron oxide containing an alkali compound having a fluidizable particle size, maintaining the linear gas velocity in said reduction zone sufficiently low to suspend the finely divided particles in a pseudo-liquid dense phase condition but sufficiently high to produce rapid circulation of the particles throughout the dense phase, reducing iron oxide to elementary metal at a temperature above 500° F. and below 700° F. at a pressure of at least 100 pounds per square inch gage for a period of time of at least 10 hours sufficient to reduce iron oxide to elementary metal, whereby sintering and agglomeration of the iron oxide particles is prevented during reduction, and thereafter contacting the finely divided iron contact material thus subjected to reducing treatment with an upwardly flowing reaction mixture comprising hydrogen and carbon monoxide at a gas velocity effective to suspend finely divided contact material in said stream of reactants at a temperature level effective to produce the desired catalytic reaction.

5. In a process for reacting hydrogen and carbon monoxide in which a gaseous mixture comprising said hydrogen and carbon monoxide is contacted with a finely divided contact material consisting essentially of reduced iron containing an alkali compound, the steps comprising continuously flowing a reducing gas consisting essentially of hydrogen upwardly through a reduction zone in contact with an iron oxide containing an alkali compound having a particle size less than about 250 microns, maintaining the linear gas velocity in said reduction zone sufficiently low to suspend the finely divided particles in a pseudo-liquid dense phase condition but sufficiently high to produce rapid circulation of the particles throughout the dense phase, reducing substantially all of the iron oxide completely to elementary metal at a temperature above 500° F. and below 700° F. and at a pressure between about 100 and about 500 pounds per square inch gage for a period of time between about 10 and about 60 hours, whereby sintering and agglomeration of the iron oxide particles is prevented during reduction, and thereafter contacting the finely divided iron contact material thus subjected to reducing treatment with an upwardly flowing reaction mixture comprising hydrogen and carbon monoxide at a gas velocity effective to suspend finely divided contact material in said stream of reactants at a temperature level effective to produce the desired catalytic reaction.

6. In the process of claim 5 in which the flowing reaction mixture comprising hydrogen and carbon monoxide is at a gas velocity effective to suspend said finely divided contact material in said stream of reactants in a dense fluidized pseudo-liquid condition.

References Cited in the file of this patent

UNITED STATES PATENTS

| | | |
|---|---|---|
| 2,360,787 | Murphree et al. | Oct. 17, 1944 |
| 2,389,133 | Brassert et al. | Nov. 20, 1945 |
| 2,409,707 | Roetheli | Oct. 22, 1946 |
| 2,441,594 | Ramseyer | May 18, 1948 |
| 2,445,795 | Millendorf | July 27, 1948 |
| 2,447,505 | Johnson | Aug. 24, 1948 |
| 2,455,419 | Johnson | Dec. 7, 1948 |
| 2,479,435 | Vesterdal | Aug. 16, 1949 |
| 2,481,226 | Krebs | Sept. 6, 1949 |
| 2,483,512 | Voorhies et al. | Oct. 4, 1949 |
| 2,485,945 | Walker | Oct. 25, 1949 |
| 2,533,694 | Safford | Dec. 12, 1950 |

OTHER REFERENCES

"Transactions of the American Institute of Mining and Metallurgical Engineers," vol. 135, pages 69–70 (1939).